United States Patent [19]

Nelson et al.

[11] 3,787,670

[45] Jan. 22, 1974

[54] AUTOMATIC DIAGNOSTIC SYSTEM

[75] Inventors: Paul E. Nelson, Chelmsford; Russell H. Peterson, Acton, both of Mass.

[73] Assignee: Honeywell Information Systems Inc., Waltham, Mass.

[22] Filed: Dec. 20, 1971

[21] Appl. No.: 209,957

[52] U.S. Cl. ................. 235/153 AC, 235/61.11 R, 235/61.11 E, 324/73 R, 324/73 AT
[51] Int. Cl. ............................................ G06f 11/04
[58] Field of Search..235/61.11 R, 61.11 A, 61.11 B, 235/61.11 C, 61.11 E, 61.6 R, 61.6 C, 61.6 H, 153 A, 153 AK, 153 AC; 324/73 R, 73 AT, 158 R; 340/172.5

[56] References Cited
UNITED STATES PATENTS

| | | | |
|---|---|---|---|
| 3,330,943 | 7/1967 | Hawkins | 235/153 A X |
| 3,599,179 | 8/1971 | Arnold | 235/153 AK X |
| 3,493,771 | 2/1970 | Beltz et al. | 235/61.11 E X |
| 3,204,950 | 9/1965 | Hanchett | 235/61.11 R X |

Primary Examiner—Malcolm A. Morrison
Assistant Examiner—R. Stephen Dildine, Jr.
Attorney, Agent, or Firm—Ronald T. Reiling; Faith F. Driscoll

[57] ABSTRACT

In a computer having a peripheral device and a central processor including a memory and an arithmetic unit, an anticipatory diagnostic system including a plurality of monitor units for observing operation of a peripheral device, gating means for selecting the monitor unit whose output is to be interrogated, means responsive to the gating means for quantizing the output of the selected monitor unit and means for storing the quantized output for redelivery to the central processor upon a subsequent command.

16 Claims, 5 Drawing Figures

3,787,670

AUTOMATIC DIAGNOSTIC SYSTEM

FIELD OF INVENTION

This invention relates to a machine implemented system for diagnosing a source of a failure in a computer, and more particularly to such a system for anticipatorily diagnosing possible sources of future failures before they occur.

SUMMARY OF INVENTION

It is an object of this invention to provide a system for routinely, automatically, monitoring a machine to diagnose degradation of machine operations anticipatory to failure and for determining the potential trouble source of predicted failures.

It is a further object of this invention to provide such a system for applying the stored results of prior, routine, monitoring operations in response to a machine malfunction to locate the failure that caused the malfunction.

The invention features a diagnostic system for use in a computer having a peripheral device and a central processor including a memory and an arithmetic unit. There is a plurality of monitor units for observing operations of particular parts of the peripheral device. Gating means are used to select a monitor unit whose output is to be interrogated. There are means responsive to the gating means for quantizing the output of a selected monitor unit and further means for storing the quantized output for delivery to the central processor upon a subsequent command.

DISCLOSURE OF PREFERRED EMBODIMENT

Other objects, features and advantages will occur from the following description of a preferred embodiment and the accompanying drawings in which.

Figure 1:
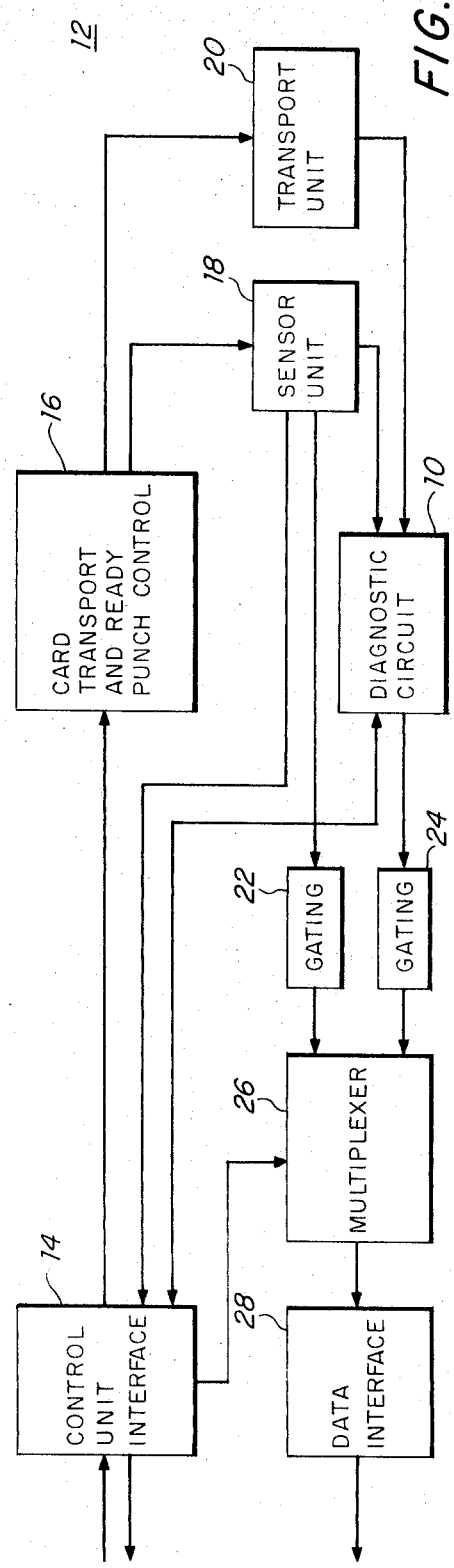
FIG. 1 is a block diagram of a card reader and punch device including diagnostic circuits according to this invention.

Diagnostic circuit 10, FIG. 1, according to this invention may be included in a card reader/punch system 12 which includes a control unit interface 14 for interacting with the rest of the computer system and a card transport and read/punch control 16. There is a sensor unit 18 which includes the read and punch circuits, a light source and the read and punch matrices of photocells which effect the read and punch operations on the card. Transport unit 20 includes the mechanism which moves a card through the card read/punch system. Gating circuits 22 and 24 control the selection of the output of sensor unit 18 and diagnostic circuit 10, respectively. The output of gating circuits 22 and 24 is supervised by multiplexer circuit 26 for delivery to the data interface 28 which operates to deliver the data from the card read/punch system 12 to the rest of the computer system.

A command to the card read/punch system 12 arrives at control unit interface 14 to be directed either to multiplexer 26 to select the proper one of gates 22, 24 or to card transport and read/punch control 16, which decodes an instruction and directs it to the proper one of sensor unit 18 and transport unit 20 to effect the desired action. In addition a command may be routed through control unit interface 14 to diagnostic circuit 10 to direct operations therein and signals from both diagnostic circuit 10 and sensor unit 18 may be directed to control unit interface 14 for delivery to the central processor to initiate diagnostic routines in the event of certain types of failures in the card reader/punch system 12. Some of the photocells in sensor unit 18 serve a dual purpose in that they are interconnected with and function as a part of the diagnostic circuit 10.

Typically, diagnostic circuit 10 may be used in any one of various commercially available card readers, card punches, and card reader/punch machines, such as a Honeywell 214-1A or 214-2A card reader/punch, Honeywell PCR-1 or PCR-2 card reader, and Honeywell 123A/223A card reader. The diagnostic system of this invention is not limited to card readers and punches but may be used in various other devices such as tape drives, disk drives, keyboard inputs, plotters, printers and the like.

Figure 2:
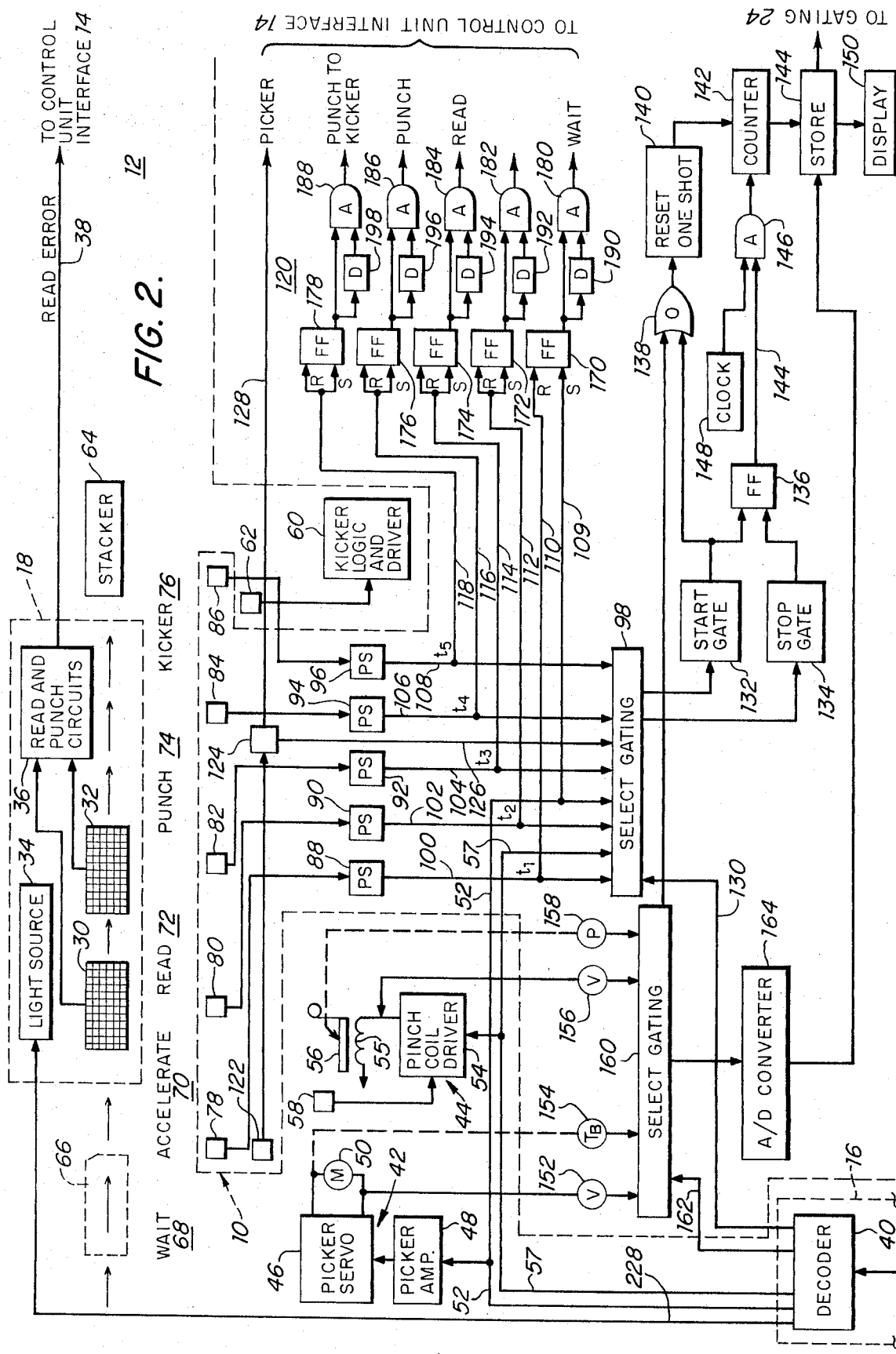
FIG. 2 is a more detailed schematic diagram of the diagnostic circuits and certain portions of the card reader and punch shown in FIG. 1.

Sensor unit 18 may include, FIG. 2, a matrix of photocells 30 for reading a controls and a second matrix of photocells 32 for controlling the punching of the card, an a light source 34 cooperating with matrices 30 card, and 32. Read and punch circuits 36 are provided to supervise card movement operations and may provide a read error signal on line 38 to inform the computer central processor when a read error has been made so that the punching operation can be stopped or other suitable or corrective action taken. A command received in card transport and read/punch control 16, FIG. 1, may be interpreted and distributed to the proper unit by a decoder 40, FIG. 2, which controls inter alia: the picker unit 42 and pinch unit 44 contained in transport unit 20. Picker unit 42 includes a picker servo 46 controlled by picker amplifier 48 and driven by picker motor 50. Picker amplifier 48 is caused to actuate picker servo 46 by a signal on line 52 from decoder 40. Pinch unit 44 includes a pinch coil driver 54 which controls operation of the pinch roller mechanism 56. Pinch coil driver 54 is enabled upon the receipt of a signal on line 57 from decoder 40 in conjunction with a signal from photocell 58 indicating that a card is in the proper position. Also included in transport unit 20 is the kicker logic and driver 60 which functions when its associated photocell 62 indicates that there is a card in the proper position. It then operates to kick the card into the stacker 64. In operation, a card 66 begins its travel through card reader/punch 12 upon a signal from decoder 40 on line 52 which instructs picker amplifier 48 to actuate picker servo 46. Picker servo 46 picks the card and places it into the wait station 68. A second signal on line 57 actuates pinch unit 44 if photocell 58 has sensed that a card is present in the wait station 68 and accelerates that card to the read station 72 through the acceleration station 70. The card then moves through the read station 72, proximate photocell matrix 30, and through the punch station 74, proximate photocell matrix 32, and arrives at the kicker station 76 whereupon it is sensed by photocell 62 which causes the kicker logic and driver 60 to be actuated whereby the card 66 is kicked to stacker 64.

Diagnostic circuit 10 preferably includes a number of monitor units, photocells 78, 80, 82, 84 and 86 which observe the progress of card 66 as it moves through the successive stations from the picker unit 42 to the stacker 64. These photocells are shown as independent elements in FIG. 2 but one or more of them may be constituted by photocells which are included in the matrices 30 and 32. The output of photocells 78, 80, 82, 84 and 86 are directed through pulse shapers 88, 90, 92, 94 and 96 whose outputs are delivered directly on lines 100, 102, 104, 106 and 108 to select gating 98 and on line 110, 112, 114, 116 and 118 to jam circuits 120 which will be discussed in more detail infra. An additional photocell 122 located adjacent picker unit 42 observes the operation of picker servo 46 and picker motor 50 and delivers signals indicative of that operation to the pulse shaping and timing circuit 124. Timing circuit 124 provides a signal on line 126 to select gating 98 at the beginning of the picker servo 46 operation and provides an error signal on line 128 if picker unit 42 fails to complete a cycle of operation in response to a signal on line 52 or overruns a single cycle of operation in response to said signal. Other inputs to select gating 98 include the signals on line 52 and 57 from decoder 40.

An instruction on line 130 from decoder 40 directs select gating 98 to select any two of the signals at its input to operate start gate 132 and stop gate 134. Upon operation of start gate 132 flip-flop 136 is set and a signal is provided through OR gate 138 to reset one shot 140 which resets counter 142 to zero. The set signal at the input to flip-flop 136 generates a signal on line 144 to provide one input to AND circuit 146. When that input is present signals from clock circuit 148 are passed through AND circuit 146 to be accumulated or counted in counter 142. Upon operation of stop gate 134 flip-flop 136 is reset inhibiting the flow of clock pulses through AND gate 146 and stopping the accumulation counter 142. This action functions to quantize the time period between the operation of the start gate and the operation of the stop gate by converting that period of time into a series of digital pulses counted by counter 142. The accumulated count in counter 142 is available to store circuit 144 whose contents may be delivered to gating circuit 24, FIG. 1 or to a local or remote display 150.

A second set of monitor units of a different type, i.e., which measure quantities other than time such as voltage, temperature, speed of rotation, pressure and the like may also be used in diagnostic circuit 10. Measuring device 152 may be used to measure the voltage provided to picker motor 50. Measuring device 154 may be provided to measure the temperature of the bearings of picker motor 50. Similarly a voltage measuring device 156 may be provided to monitor the voltage to the pinch coil 55 in pinch unit 44 and a pressure measuring device 158 may be provided to monitor the pinch pressure in the pinch unit 44. The output of measuring devices 152, 154, 156 and 158 are provided to select gating 60 which upon a signal on line 162 from decoder 40 may select any one of those inputs to be provided to A/D converter 164. Converter 164 quantizes the analog values provided by devices 152, 154, 156 and 158 to represent them in a digital form which may be stored in store circuit 144.

Jam circuit 120 includes flip-flops 170, 172, 174, 176 and 178 connected to photocells 78, 80, 82, 84 and 86, respectively, through intermediate circuitry previously described. Each of the flip-flops is set by a signal from its respective photocell when that photocell becomes covered by the card 66 and is provided with a reset signal when that photocell is once again uncovered after the card has passed by, except for flip-flop 170 which is set by the picker signal on line 109 and reset by photocell 78 becoming covered. Upon the receipt of the set signal each flip-flop provides a signal to one input of its associated AND gate 180, 182, 184, 186 and 188, respectively, and also provides an input to an associated delay circuit 190, 192, 194, 196 and 198, respectively, the output of each of which is delivered to the second input to the associated AND circuit upon the passing of a predetermined time sufficient to enable the card to clear a particular photocell. If the card does not clear a particular photocell in the prescribed time then the signal from the setting of the flip-flop plus the output of the delay will trigger the related AND circuit and provide a jam signal. If however, the card does pass over the photocell within the prescribed time, then a reset signal is provided to that flip-flop resetting it and removing the signal provided directly to the associated AND gate so that the signal to the AND gate from the associated delay will appear at the input without the conjunctive occurrence of the other necessary signal.

A different type of failure is indicated by the output of each of the different AND gates. An output from AND gate 180 indicates that a card has been stalled in the wait station 68 and never reached photocell 78. An output from AND gate 182 indicates that a card has been stalled in the acceleration station 70 covering photocell 80. An output from AND gate 184 indicates that a card has been stalled in the read section 72 covering photocell 82. An output from AND gate 186 indicates that a card has been stalled in the punch station 74 covering photocell 84. And an output from AND gate 188 indicates that a card has been stalled in the punch to kicker station 76 covering photocell 86. The output of these AND gates along with the output derived from the picker photocell 122 provided on line 128 are submitted to the control unit interface 14 as jam signals.

Under software control any one of the measuring devices 152, 154, 156 and 158 may be selected by select gating 160 to be submitted to A/D converter 164. Similarly any two of the inputs to select gating 98 may be selected to operate start gate 132 and stop gate 134. For example, the signal on provided to 52 providedto initiate action of the picker unit 42 may be selected to operate stop gate 134. In that case an abnormally high count in counter 142, would indicate that there was some interference with the efficient motion of the card. If the card never reached photocell 78 then a jam signal would be produced by AND gate 180.

If it was desired to further analyze or anticipate a problem in the area of wait station 68 and picker unit 42 the signal on line 52 might be used again to operate start gate 132 but the signal on line 126 from the picker photocell 122 might be used to operate the stop gate 134. This would provide the information concerning the elapsed time between the occurrence of signal which energized the picker unit 42 and the completion of the proper operation of the picker servo 46. If even further analyzing of picker unit 42 was desired the voltage being provided to picker motor 50 might be monitored through voltage measuring device 152. If it appeared that the voltage was proper a further measurement of the temperature of the motor bearings might be made for example to determine if that was the source of the malfunction or the source of a future problem.

The acceleration station 70 may be monitored by selecting photocell 78 to operate start gate 132 and photocell 80 to operate stop gate 134. Then the elapsed time would be a measure of the acceleration provided by the pinch unit 44. Instead of measuring the time it takes a card to move from photocell 78 to photocell 80 through acceleration station 70 it might be advantageous to measure the time from actuation of the pinch unit 44 until the card passes photocell 80. In that case a signal on line 57 would be selected to operate start gate 132 instead of a signal derived from photocell 78. In a similar manner photocells 80 and 82, 82 and 84, and 84 and 86 may be selected in pairs. However it is not a requirement that the photocells be used in sequence as any pair may suffice to provide useful information.

Just as measuring devices 152 and 154 have been used to further isolate malfunctions in picker unit 42, measuring devices 156 and 158 may be used to further isolate malfunctions in pinch unit 44. Measuring device 156 may be used to determine if pinch coil 55 is receiving a proper voltage and pressure measuring device 158 may be used to sense whether there is proper pressure at the pinch roll 56.

The ability to select any monitor unit and any combination of monitor units in any sequence makes the diagnostic system of this invention extremely flexible. For example, if there is a malfunction or degradation in operation at any station the operation at that station and at each previous station could be examined to determine the location of the degradation. After the degradation has been thus localized typically using elapsed time measurements by photocell pairs then the cause of the degradation could be determined using the measuring devices. If the degradation occurs at wait station 68, for example, the pincher mechanism operation might be monitored using photocell 122 to determine the integrity of the physical operation. If that operation is satisfactory then the voltage to picker motor 50 might be checked using voltage measuring device 152 to determine whether the motor might be underpowered. If the voltage is correct then the temperature of the bearings of motor 50 might be measured using temperature measuring device 154, to determine whether the degrading performance might be due to a worn motor.

Similarly with respect to pinch unit 44 a monitoring of the time that elapses while a card passes from photocell 78 to photocell 80 through acceleration station 70 might only indicate that pinch unit 44 seems to be slowing down. But an insufficient voltage reading by voltage measuring device 156 would indicate the slow down was due to lack of power. Alternatively, a sufficient voltage reading by voltage measuring device 156 but a low pressure reading by pressure measuring device 158 might indicate that the source of a problem is a worn or misadjusted pinch roll.

Thus while the monitor units including the photocells may be used to evaluate the movement of the information-bearing media through the mechanism such as by evaluating a period of time that the media requires to move between two points, the other types of monitor units such as the voltage, temperature, and pressure measuring devices may be used to judge those qualities which pertain to the operation of the mechanism itself. Thus both in routine and in anticipatory diagnosis performed according to this invention, and under diagnosis performed in response to a jam signal, an area of malfunction or degradation or of failure, in the case of a jam, may be isolated to a particular area by use of the monitor units including the photocells and then may be analyzed as to its particular mode of failure by use of the measuring devices.

Typically, diagnostic circuit 10 is controlled by and delivers information through gating circuit 24 under the supervision of the central processor of the computer under the control of a software system. The response or output generated by diagnostic circuit 10 in response to a request is compared under control of the software system to reference data to indicate whether the operation of a specific observed portion of the card read and punch system is operating properly and if not, to determine the level of its degradation, and to decide whether and what further monitoring information should be reviewed.

Figure 3:
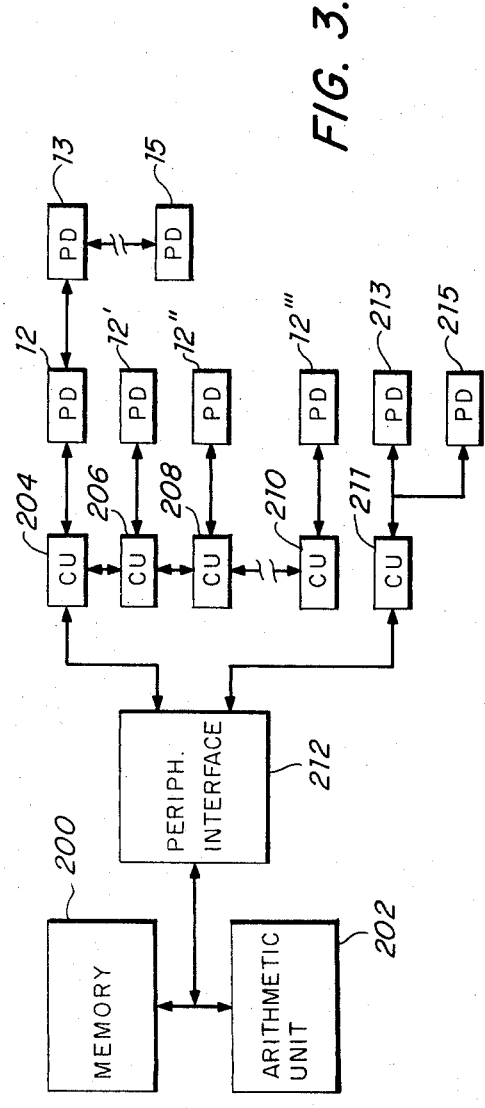
FIG. 3 is a block diagram of a computer system which may employ the diagnostic system according to this invention.

The diagnostic circuit 10 may be used in any of a number of different types of computer systems. One such system is shown in FIG. 3 with a central processor including a memory 200 and an arithmetic unit 202. There are a number of peripheral devices such as card read/punch system 12, FIG. 2 and other similar types of devices 12', 12'' and 12''', each of which has an associated control unit 204, 206, 208, 210, which interconnects it through a peripheral interface 212 with the central processor which includes memory 200 and arithmetic unit 202. Peripheral interface 212 may support a number of different sets of control units each of which may interact with one or more peripheral devices as indicated by the arrangement of control unit 211 and peripheral devices 213 and 215. In addition peripheral devices may be interconnected with other peripheral devices such as indicated by the arrangement of peripheral devices 13 and 15. Such computer systems are disclosed in U. S. Pat. No. 3,369,221 and 3,323,110 and are embodied in such well known computers as the Honeywell H200 series.

Figure 4:
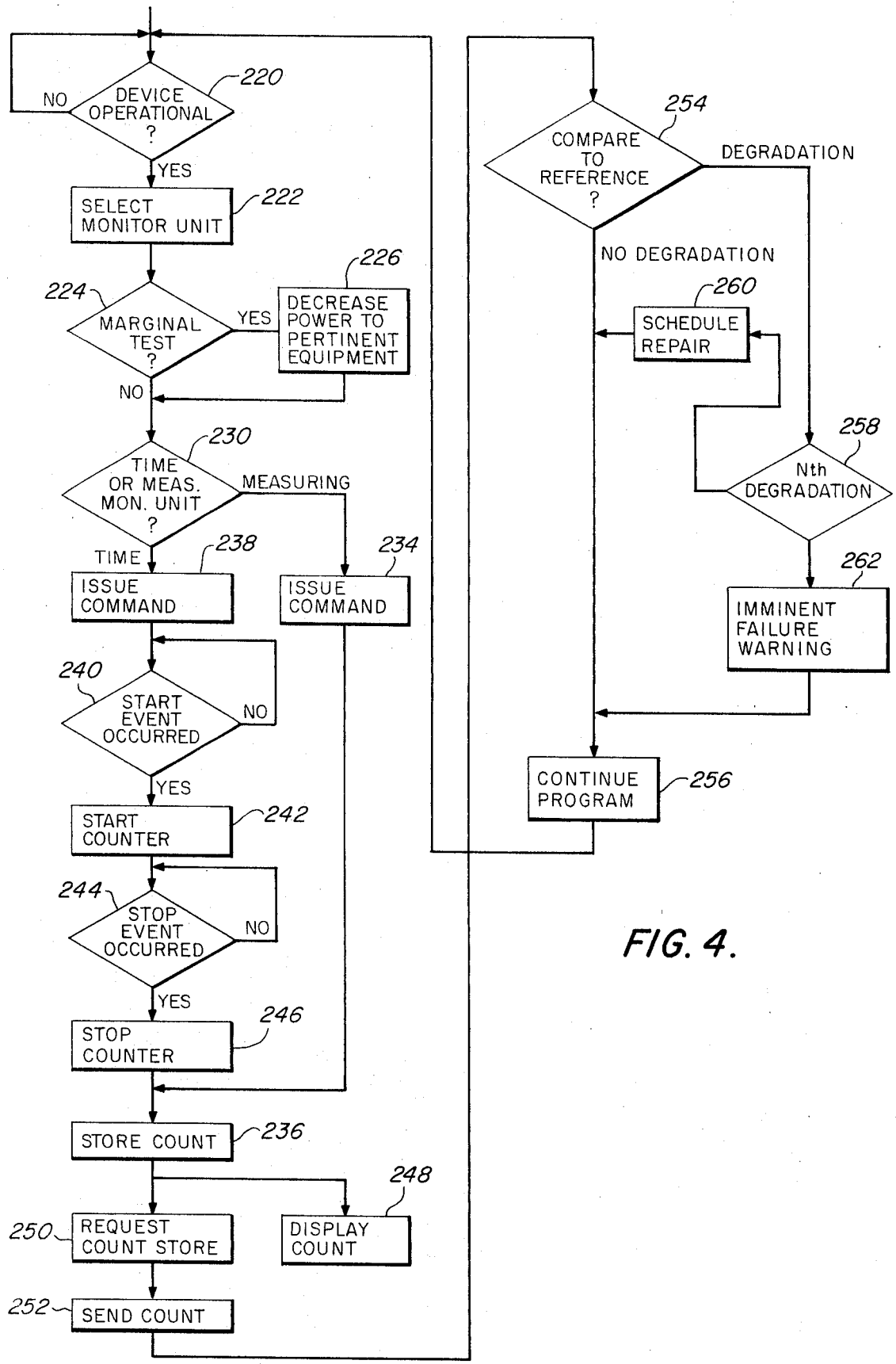
FIG. 4 is a flow chart of an anticipatory diagnostic routine for operating the computer system of FIG. 3 to utilize the diagnostic circuit of FIG. 2.

A diagnostic circuit is combined with a computer system to provide a diagnostic system according to this invention which performs anticipatory diagnosis as well as diagnosis of particular failures as indicated by a jam signal, as illustrated by the flow chart in FIG. 4. Initially, in step 220, the inquiry is made as to whether the device such as the card read/punch system 12 is operational. If the answer is no, the step is recycled. If the answer is yes, a selection is made of a proper monitor unit in step 222. The monitor unit may be any one of the devices 152, 154, 156 or 158 or any pair of inputs to select gating 98, FIG. 2. Next, in step 224, the inquiry is made as to whether a marginal test is to be performed. If the answer is yes, power is decreased to the pertinent equipment in step 226. This step may take the form, for example, of decreasing the power to light source 34, FIG. 2, via line 228 upon a command from decoder 40 or of decreasing the power to the picker amplifier 48 or the pinch coil driver 54. Following this action, or, immediately after step 224, if the answer to step 224 is no, the inquiry is made in step 230 as to whether the selected monitoring unit is to be one which observes the time between certain occurrences or measures other qualities. The former are the monitoring units which are controlled by select gating 98 to operate start gate 132 and stop gate 134, and the latter are the voltage, temperature and pressure measuring devices which are controlled by select gating in FIG. 2. If a measuring unit is selected a command is issued in step 234, as a result of which the measured value in quantized form, usually a digital count, is supplied directly to be stored in step 236. If a time unit is selected in step 230 a command is issued in step 238 to select the proper monitoring unit by means of select gating 98, FIG. 2. Inquiry is then made as to whether the start event has occurred in step 240. If the event has commenced the counter is started in step 242 and further inquiry is made, step 244, to determine when the stop event occurs. When the stop event occurs the counter is stopped in step 246. Following the end of counting, the count is stored in step 236.

In whichever manner the quantized value has been derived it now resides in storage after step 236. The count may then simultaneously be displayed in step 248 either locally at the card read/punch system or remotely back at the main computer system. Simultaneously the central processor through the control unit may make a request to receive the count present in the store circuit 144 in step 250. That count is sent to the central processor in step 252. In the central processor the count is compared to some reference in step 254. If the comparison is favorable the system is instructed to continue the program at step 256 and is cycled back to the initial step 220. If the comparison is not favorable, that is, a degradation has taken place, a further inquiry is made in step 258 as to the trend of the degradation. If the degradation has occurred fewer than n times then in step 260 an indication is printed out to schedule the particular area being monitored for repair during the periodic servicing. If the degradation has occurred $n$ or more times than in step 262 an imminent failure warning is produced in response to which a call for immediate repair service may be promulgated or the entire system may be stopped to prevent further damage of the components.

Typically an idler routine may be provided to observe each of the stations 68, 70, 72, 74, and 76 during the transportation of each card so that upon a jam signal information relating to the station at which operation was arrested may be immediately retrieved from store circuit 144. This routing may be implemented either by software which constantly sequences through photocells 78, 80, 82, 84, and 86 in pairs using select gating 98 or by hardware such as by having a plurality of circuits such as that including and associated with start gate 132 and stop gate 134 for accumulating a count indicative of an interval between two events which define an area to be observed.

Figure 5:
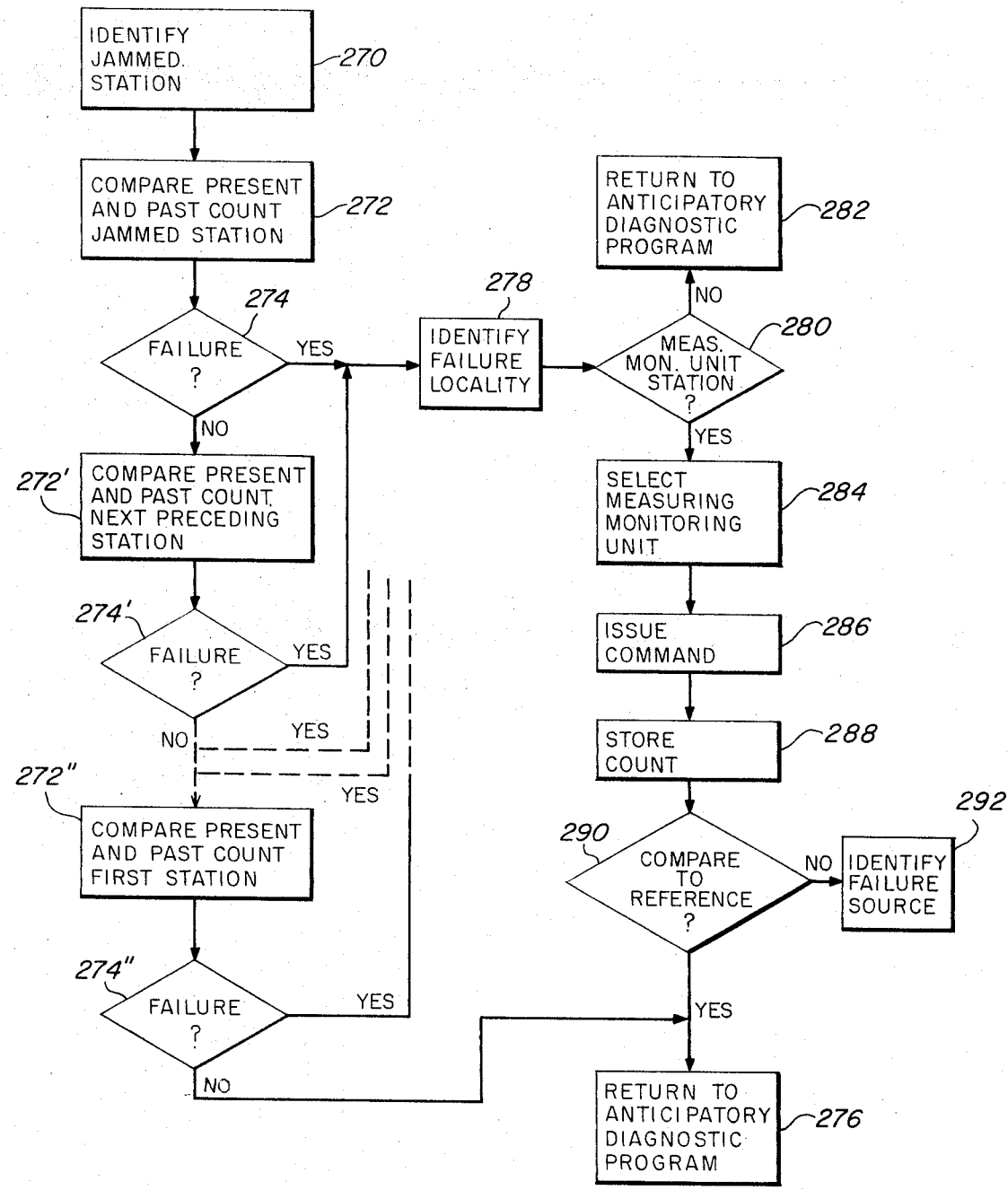
FIG. 5 is a flow chart of a "jam" routine for performing diagnosis subsequent to a failure in the card reader sensed by the diagnostic system of FIG. 2.

A jam routine which may be called into operation upon the occurrence of an actual failure and which may be incorporated in the system described in FIG. 4 is illustrated in the flow chart of FIG. 5. Initially in step 270 there is made to the system an identification of the jammed station such as by a signal from one of AND gates 180, 182, 184, 186, and 188 or a signal on line 128 from the picker photocell or a read error on line 38. In the next step 272 the present count representing transit time through the jammed station is compared with a previous count for the same station. Subsequently, in step 274 the inquiry is made to determine whether the comparison was sufficiently unfavorable to indicate a failure. If no failure was indicated another comparison is made in step 272' similar to that made in step 272 with the exception that the present count for the next station preceding the jam station is compared to the past count for that station next preceding the jam station. A failure inquiry is made again in step 274' and the system will continue on to the first station represented by step 272'' and 274'' as long as the answer to the failure inquiry is no. Following a no, from the final failure inquiry in step 274'', the system is returned in step 276 to the performance of the anticipatory diagnostic program illustrated in FIG. 4.

Upon the determination that a failure has occurred at any failure inquiry step such as for example at failure inquiry step 274 the locality of the failure, i.e., the station, is identified in step 278. Following this in step 280 inquiry is made to determine whether the station identified in step 278 is one which contains the measuring type of monitoring unit. If the answer is no the system can provide no further information and the system is returned in step 282 to the anticipatory diagnostic program illustrated in FIG. 4 which will continue the device surveillance. If the answer is yes, one of the measuring device monitoring units is selected in step 284. A command is then issued in step 286 to store the measured information. The quantized form of the measurement typically in the form of a count is then stored in step 288. Upon comparison of that count to a reference in step 290 an identification of the failure source will be made in step 292 if the comparison is unfavorable. If the comparison is favorable the system will simply return in step 276 to the anticipatory diagnostic program illustrated in FIG. 4.

Other alternative and more elaborate routines may be used to diagnose failures and to perform anticipatory diagnosis using the diagnostic system and circuits of the invention.

Other embodiments will occur to those skilled in the art and are within the following claims:

What is claimed is:

1. In a computer having a peripheral device and a central processor including a memory and an arithmetic unit, an anticipatory diagnostic system comprising:
   a plurality of monitor units for observing operation of a said peripheral device;
   gating means for selecting a said monitor unit whose output is to be interrogated;
   means, responsive to said gating means, for quantizing the output of a selected said monitor unit; and,
   means for storing the quantized output for redelivery to said central processor upon a subsequent command for determining a degradation in the operation of said device.

2. In a computer having a peripheral device and a central processor including a memory and an arithmetic unit, an anticipatory diagnostic system comprising:
   a plurality of monitor units for observing operation of a said peripheral device and each including a photocell;
   gating means for selecting a said monitor unit whose output is to be interrogated;
   means, responsive to said gating means, for quantizing the output of a selected said monitor unit; and, means for storing the quantized output for redelivery to said central processor upon a subsequent command.

3. The anticipatory diagnostic system of claim 2 in which said gating means includes means for selecting a said monitor unit in response to a control signal from said central processor.

4. The diagnostic system of claim 3 in which said quantizing means includes a start gate and a stop gate responsive to a monitor unit, counter means, a clock circuit and a logic circuit for passing clock pulses to said counter means from the time said start gate is actuated by said monitor unit until said stop gate is actuated by said monitor unit.

5. The anticipatory diagnostic system of claim 2 in which a said monitor unit including a photocell observes a unique station along the path of travel of the information media in the peripheral device.

6. The anticipatory diagnostic system of claim 5 further including means for detecting a failure at each of said stations.

7. In a computer having a peripheral device and a central processor including a memory and an arithmetic unit, an anticipatory diagnostic system comprising:
a plurality of monitor units for observing operation of a said peripheral device and each including a measuring device having an analog electrical output;
gating means for selecting a said monitor unit whose output is to be interrogated;
means, responsive to said gating means, for quantizing the output of a selected said monitor unit; and,
means for storing the quantized output for redelivery to said central processor upon a subsequent command.

8. The anticipatory diagnostic system of claim 7 in which said gating means includes means for selecting a said measuring device.

9. The anticipatory diagnostic system of claim 6 in which said quantizing means includes an analog to digital converter.

10. A machine implemented anticipatory diagnostic method of monitoring the operation of a system comprising:
selecting a monitor unit of a plurality of monitor units associated with an area of said system to be observed;
initiating operation of the system;
quantizing a quality observed with said monitor unit; and,
comparing said quantized quality with a predetermined similar quantized quality to grade the operational performance of said area observed.

11. The machine implemented anticipatory diagnostic method of claim 10 further including determining degradation in performance in the observed area and indicating the necessity for maintenance.

12. A machine implemented anticipatory diagnostic method of monitoring a system comprising:
selecting a monitor unit associated with the area to be observed;
initiating operation of the system;
quantizing a time period observed with said monitor unit, said quantizing including starting to count pulses at the beginning of an observed event and stopping the counting of pulses at the end of the event; and,
comparing said quantized time period with a predetermined similar quantized time period to grade the performance of that area observed.

13. A machine implemented anticipatory diagnostic method of monitoring the areas of a system comprising:
selecting a monitor unit associated with the area to be observed;
initiating operation of the system;
quantizing a quality observed with said monitor unit, said quantizing including converting a measured analog signal into digital information; and,
comparing said quantized quality with a predetermined similar quantized quality to grade the performance of that area observed.

14. A machine implemented anticipatory diagnostic method for determining a failure mode in a system comprising:
identifying the station of the system at which a malfunction has occurred;
selecting a monitor unit associated with the station at which a malfunction has occurred;
comparing a quantized quality presently observed at that station with a predetermined quantized quality to grade the performance of that station;
determining whether a failure has occurred; and identifying the locality of that failure.

15. The machine implemented anticipatory diagnostic method of claim 14 in which comparing further includes comparing a quantized quality observed at a prior station with a quantized quality previously observed at that prior station.

16. The machine implemented anticipatory diagnostic method of claim 14 further including selecting a second monitor unit associated with the operating unit at a station; converting the measured analog signal from that second monitor unit into digital information, determining degradation in performance of that operating unit and indicating the source of the failure at that station.

* * * * *

UNITED STATES PATENT OFFICE
CERTIFICATE OF CORRECTION

Patent No. 3,787,670          Dated January 22, 1974

Inventor(s) Paul E. Nelson, et al.

It is certified that error appears in the above-identified patent and that said Letters Patent are hereby corrected as shown below:

At designation [75] "Inventors", delete "Russell H. Peterson" and insert --Russell H. Petersen--.

Signed and sealed this 9th day of April 1974.

(SEAL)
Attest:

EDWARD M. FLETCHER, JR.
Attesting Officer

C. MARSHALL DANN
Commissioner of Patents